Jan. 16, 1951  D. D. GRIEG  2,537,991

PULSE MULTIPLEX DROP CHANNEL SYSTEM

Filed May 14, 1945

INVENTOR.
DONALD D. GRIEG

BY Percy P. Lantz

ATTORNEY

Patented Jan. 16, 1951

2,537,991

UNITED STATES PATENT OFFICE 2,537,991

PULSE MULTIPLEX DROP CHANNEL SYSTEM

Donald D. Grieg, Forest Hills, N. Y., assignor to Federal Telephone and Radio Corporation, New York, N. Y., a corporation of Delaware Application May 14, 1945, Serial No. 593,621

10 Claims. (Cl. 179—15)

This invention relates to communication systems and particularly to systems in which a plurality of channels of intelligence are transmitted substantially simultaneously by transmitting sequentially at a high rate small signal increments from the different channels in the form of discrete signal modulated pulses. The principles of the invention can be applied, however, to other types of signalling systems and to distribution systems in which the signal currents of electrical quantities to be transmitted are conveyed as a series of spaced pulses having a characteristic pulse frequency.

One of the objects of this invention is to effect in a pulse multiplex system the dropping of a channel at a desired point along a transmission path such, for example, as at terminal and branch stations.

Another object of the invention is to provide an electron device such as a cathode ray tube by which any one pulse or certain selected pulses present in successive pulse groups in a train of pulses may be eliminated therefrom.

Another object of the invention is to provide means for receiving a group of pulses in time sequence and for spreading them out in spatial sequence within a beam deflection tube in such a way that the tube, through the action of the sweep voltage, automatically directs certain pulses to one circuit or electrode, and the other pulses to another circuit or electrode.

According to a feature of my invention, a train of channel pulses is applied to the grid of cathode ray tube or other electron beam device which includes a barrier electrode having one or more apertures located along the sweep path normally traced by the cathode ray beam. The train of channel pulses is preferably of the character containing in one form or another a synchronizing signal by which a suitable sweep potential may be controlled to produce a desired sweep movement of the electron beam. The barrier electrode serves as an electron collector and a second collector electrode is located rearwardly of the barrier to collect electrons passing through the aperture of the barrier electrode. The output circuit is arranged to pass the energy collected by the barrier electrode thereby eliminating any pulses applied to the grid of the tube the instant the beam coincides with an aperture in the barrier.

In addition to the general feature of the invention discussed above, many variations of the cathode ray tube may be made particularly as regards the sweep movement of the cathode ray beam and the size and location of the aperture in the barrier electrode. For a further understanding of the objects and features of my invention, reference is made to the following detailed description of certain embodiments of the invention illustrated in the accompanying drawings in which.

Figure 1:
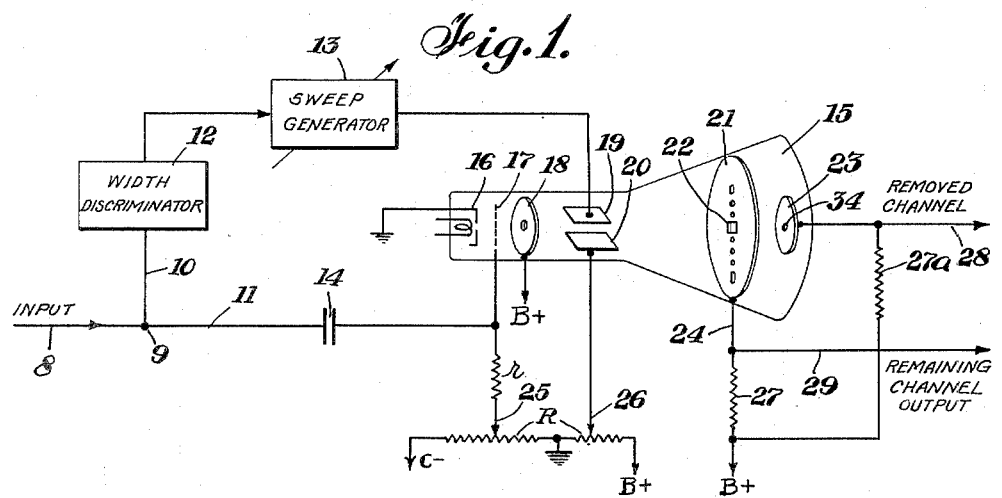
Fig. 1 is a schematic view of a cathode ray tube and associated circuit according to one embodiment of my invention.

In Fig. 1, a train of pulse series M—1—2—3—4—5—6—7 is applied over input conductor 8 to a junction point 9 of connections 10 and 11. The pulses are supplied over connection 10 to a pulse width discriminator device, or pulse selector 12 of for example, the type shown in the copending application of Emile Labin, Serial No. 551,203, filed August 25, 1944, now Patent No. 2,477,625, entitled Television Systems, connected to the input of a sweep generator 13. Condenser 14 connects line 11 to the grid of pulse dropper tube 15. The output of the sweep generator is connected to a deflecting plate of the dropper tube 15. The sweep generator is adjustable to vary the amplitude of the maximum sweep voltage and the time length of the sweep. The sweep generator may supply a saw tooth wave, or any other wave that can be made to accomplish the desired function.

One embodiment of the pulse dropper tube 15 is shown in Fig. 1. It comprises a grounded cathode 16, a grid 17, beam forming and beam accelerating electrode structure 18; a pair of horizontal deflecting plates 19, 20; a barrier electrode 21 with aperture 22, and a collector electrode 23.

The potentials required for operation of the tube are supplied from sources of B+ and C— potential, as indicated schematically in Fig. 1. Since circuits of this type are well known, only so much of the voltage supplying circuits is shown as is necessary to an understanding of the invention. It will be understood that other supply circuits may be used instead of those illustrated. It is obvious, also, that other types of beam deflection tubes may be used so long as the tube selected provides the structure necessary for spreading a series of timed pulses out in spatial sequence within the tube in such a way that the tube, through the action of its deflection voltages, automatically directs the desired pulses into its output circuit and undesired pulses away from its output circuit.

Positive potential is applied to beam forming or beam accelerating electrode 18, and positive potential is applied also to the barrier and collector electrodes 21 and 23 to the former by way of a load resistance 27 and to the latter by connection 28 from which the removed pulse may be obtained across resistor 27a. The main pulse output conductor 29 is connected to barrier electrode 21 at the upper terminal of resistance 27.

Bias resistance R supplies adjustable bias potential to grid 17 and deflection plate 20, to the former from a tap connection 25 by way of resistance r and to the latter from tap connection 26. The bias on the grid is adjusted to keep the beam turned "off" except when input pulse voltages are applied to the grid. The function of the adjustable bias on the deflection plate is to control the point from which the pulsed beam is swept across the barrier plate by the sweep deflection voltage. For a deflection sweep voltage providing a given angular extent of movement of the beam within the tube, the bias from tap 26 must be adjusted to give a proper rest position for the beam so that the deflection voltage shall have swung the beam to a point within the aperture 22 at the instant that the undesired pulse is being received.

The operation of the circuit of Fig. 1 may perhaps be best understood by visualizing the electron beam in the tube as operating like a repeating rocket which is swung up and down through an arc while it fires intermittently. The line of black spots on the barrier electrode in Fig. 1 will then represent the points at which the rocket strikes the barrier as it fires in time with incoming pulses M—1—2—3—4—5—6—7.

The operation is as follows: a recurrent group of pulses of constant cadence frequency comprising individual pulses M—1—2—3—4—5—6—7 is applied from conductor 8 to the grid 17 of tube 15 and also to the pulse width discriminator circuit 12. The latter selects, from the group, pulse M, which is different from the other pulses, such as by different pulse width, to trigger the source of sweep voltage 13 so that the latter will apply a sweep voltage across the deflection plates 19, 20 of tube 15.

The sweep voltage from 13 acts on the deflection plate simultaneously with the varying voltage on grid 17 from the group of input pulses M—1—2—3—4—5—6—7, and serves to spread these timed pulses out spatially within the tube so that the electron beam is swung across the barrier electrode in a path intersecting the aperture 22. Actually the beam is intermittent, passing only at those instants when the input pulses are being received. The electrons which pass through the aperture are caught by the collector anode 23 and are eliminated from the output conductor 29, while the electrons which are intercepted by the barrier electrode 21 cause current flow in the output conductor 29 coincident with receipt of the desired input pulses. The wide input marker pulse will produce a wide output pulse and the narrower input pulses will produce narrower output pulses at time positions corresponding to the time positions thereof at the input connection 8. The pulse which produced electron flow to the anode 23 will have been dropped from the output circuit without, however, disturbing the time positions of the undropped pulses.

Figure 2:
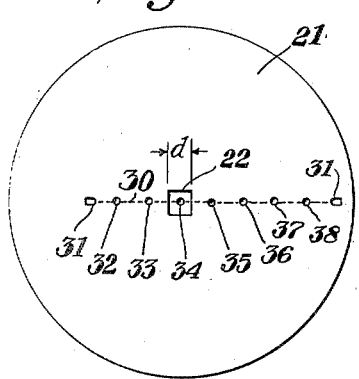
Fig. 2 is a plan view of one form of the barrier electrode that may be used in the cathode ray tube of Fig. 1.
Figure 3:
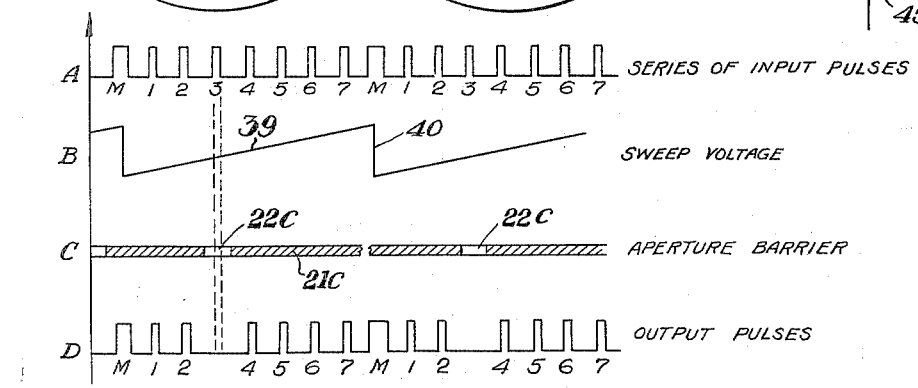
Fig. 3 is a graphical illustration useful in explaining the operation of the tube of the invention.

This operation and the relative timing of the various actions involved will be better understood by reference to Figs. 2 and 3.

Fig. 2 represents on an enlarged scale the barrier electrode 21 having aperture 22, and shows the points of interception of the beam at positions controlled by pulses M—1—2—3—4—5—6—7. For convenience, the beam is assumed to be focused to a narrow pencil. The spots at which the beam strikes the barrier electrode, i. e., the deflection positions corresponding to pulse 1, pulse 2, etc., through pulse 7, are represented at 32—33—34—35—36—37—38, respectively. The elongated cross section of the beam produced by the long marker pulse M is represented at 31. The dotted line 30 represents the direction of deflection of the beam (vertically from top to bottom in Fig. 1), the points 31 to 38 inclusive being disposed along line 30.

The width of the aperture 22 in Fig. 2 is represented at $d$; the aperture must be wide enough to pass the electron-beam, whatever be the time position or extent of time shift of the modulated pulse which it is desired to drop. Point 34 is intended to represent the center or unmodulated position of pulse 3. It will be understood that the actual sweep position of the beam may extend more to one side than the other of aperture 22, depending on the pulse of the channel group to be dropped.

The invention is applicable to systems in which the modulated pulse may be of the variable width type having a fixed leading edge and variable trailing edge, or a variable leading edge and fixed trailing edge, or variable leading and trailing edges, or of the constant width type having variable position shift.

In Fig. 3, graph A represents the series of input pulses and graph D the series of output pulses, no attempt being made to indicate the modulation of the pulses. Graphs B, C and D are lined up under graph A so that they have corresponding time positions. The sweep voltage 39 has a fly-back 40 which preferably occurs during the wide marker pulse M. The fly-back is so rapid that any electrons lost due to the fly-back of the beam across the aperture are negligible. The only effect that might be produced would be a slight deformation of the pulse M. The equivalent barrier position and equivalent aperture position are represented at 21c and 22c, respectively.

Figure 4:
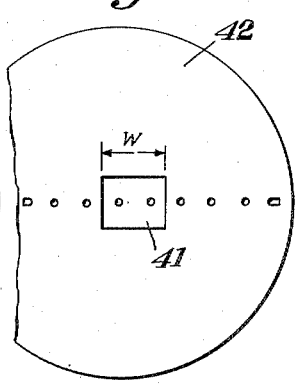
Figs. 4 and 5 are plan views of different forms of barrier plates that may be used in accordance with other embodiments of my invention.

In Fig. 4 the width $w$ of the aperture 41 in the barrier electrode 42 is made great enough to drop two adjacent pulses 3 and 4 of the pulse group M—1—2—3—4—5—6—7. It is obvious that, though in the embodiment illustrated only one aperture is utilized, a barrier plate with several apertures may be utilized in order to eliminate any pulses desired of a pulse group. The aperture openings in this case will extend over the spatial positions of the electron beam at the barrier at the time positions of the pulses it is desired to drop.

By adjusting the position bias on the deflection plates the spatial relationship of the aperture with respect to the beam positions for the individual pulses can be changed so that any desired pulse of a group may be dropped. That is, if it is desired to drop the pulses 2, 2, 2 instead of pulses 3, 3, 3 in the series of pulse groups, this may be accomplished either by using a tube having a barrier electrode with an aperture nearer the beginning of the deflection path, or by changing the bias on the deflecting plate of the tube so that the sweep position of the beam is changed. Care should be taken that in adjusting the position bias to drop a different pulse of the group, the bias shall be such as to permit the barrier to continue to intercept all desired pulses of the pulse group.

Figure 5:
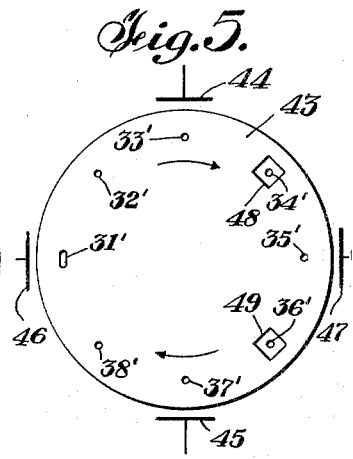

Although a straight-line deflection path is illustrated in Figs. 1, 2 and 4, it will be apparent that other deflection paths are possible and that the apertures should be disposed along the deflection path at the positions at which the beam strikes when the undesired pulses are being received. One example of a modified form of barrier electrode 43 is illustrated in Fig. 5 in which the deflection path is circular. Means including deflecting electrodes 44, 45 and 46, 47 for producing such a deflection path are well known. The positions 31', 32', 33' etc. through 38' represent the beam positions corresponding to the pulses of an incoming pulse group, with aperture 48 located so as to drop pulse 4 which occurs at position 34'. If desired, the barrier may include other apertures for dropping other pulses of the pulse group. Aperture 49, for example, at position 36' causes pulse 6 to be dropped.

From the foregoing description, it will be clear to those skilled in the art that the tube structure, the associated deflecting and beam modulating circuits and the barrier electrode and output circuit arrangement, may be changed in many ways without departing from the principles of my invention. It is to be understood, therefore, that the embodiments of the invention described and shown are given by way of illustration only and not as a limitation of the scope of my invention.

I claim:

1. Means for separating a desired series of recurring pulses from other series of pulses interleaved therewith in the form of a train, comprising means to produce a beam of electrons, means to modulate said beam on and off in accordance with the occurrence of the pulses of said train, an electron collector electrode, a barrier electrode disposed between said collector electrode and the source of said beam, said barrier electrode having an aperture therein for passage of electrons to said collector electrode, means to cause said beam to sweep in a given path across said aperture upon occurrence of the pulses of said desired series, the beam striking the barrier electrode upon occurrence of the other series of pulses, output connections from the collector electrode for the desired series of pulses, and output connections from the barrier electrode for the other series of pulses.

2. Means for separating a desired series of recurring pulses from other series of pulses interleaved therewith in the form of a train, comprising means to produce a beam of electrons, an electron collector electrode, a barrier electrode disposed in front of said collector electrode and having an aperture for passage of electrons to said collector electrode, means to cause said beam to sweep in a given path relative to said barrier electrode, means to key said beam on and off in accordance with the occurrence of the pulses of said train, means to control the beam sweep to cause the beam to coincide with said aperture when said beam is keyed on in response to the pulses of said desired series, the beam striking the barrier electrode upon occurrence of the other series of pulses, output connections from the collector electrode for the desired series of pulses, and output connections from the barrier electrode for the other series of pulses.

3. Means for separating desired series of recurring pulses from other series of pulses interleaved therewith in the form of a train, comprising means to produce a beam of electrons, an electron collector electrode, a barrier electrode disposed in front of said collector electrode and having aperture means for passage of electrons, means to key said beam on and off in accordance with the occurrence of the pulses of said train, means to cause said beam sweep along a given path relative to said barrier electrode for coincidence with said aperture means when said beam is keyed on by the pulses of those series desired, the beam striking the barrier electrode upon occurrence of the other series of pulses, output connections from the collector electrode for the desired series of pulses, and output connections from the barrier electrode for the other series of pulses.

4. A beam deflection tube comprising beam forming, beam controlling and beam deflecting electrode structure and an apertured barrier electrode in line therewith, means for applying to the beam controlling electrode structure recurrent groups of pulses having a constant group cadence frequency, means for applying to the beam deflecting electrode structure a recurrent deflecting voltage varied in a given direction, said voltage having a recurrent frequency corresponding to the recurrence frequency of said pulse groups and being phased so that pulses having a given time position in the pulse groups coincide with coincidence of the beam with said aperture, the beam striking the barrier electrode upon occurrence of the other pulses, output connections from the barrier electrode for said other pulses, the pulses of said given time position passing through said aperture and producing no output from the barrier electrode.

5. In a multiplex circuit comprising a beam deflection tube including beam forming and beam deflecting electrodes and a barrier electrode having an aperture located in the deflection path, means for applying to said tube $n$ series of spaced pulses derived from $n$ separate channels to control the electron flow according to the occurrence of the individual pulses of said $n$ series, means for supplying deflection potentials to said deflecting electrodes to direct through said aperture the electron flow produced in time with the pulses of at least one of said $n$ channels, and output connections from the barrier electrode for the pulses of the other of said $n$ channels.

6. In a multiplex circuit comprising a beam deflection tube including beam forming and beam deflecting electrodes and a barrier electrode having an aperture located in the deflection path, means to key the beam on and off in response to $n$ series of spaced pulses derived from $n$ separate channels, means including said deflecting electrodes for directing to said barrier electrode the electron flow produced in time with pulses from certain of said channels and directing through said aperture the electron flow produced in time with pulses from at least one other channel and output connections from said barrier electrode for the pulses of said certain channels.

7. In a multiplex circuit comprising a beam deflection tube including electron beam forming and beam deflecting electrodes and a barrier electrode having an aperture located in the beam deflection path, means for applying to said tube $n$ series of spaced pulses derived from $n$ separate channels to key said beam on and off in response to each pulse, means for applying a sweep voltage to said deflecting electrodes in synchronism with said $n$ series of pulses, means for controlling the voltage of said deflecting electrodes to cause the electron beam to traverse said aperture in time with the pulses of a predetermined series, and output connections from said barrier electrode for the pulses of the other series.

8. In a multiplex circuit comprising a beam deflection tube including beam forming and beam deflecting electrodes and a barrier electrode having an aperture located in the beam deflection path, means for applying to said tube $n$ series of spaced pulses derived from $n$ separate channels to control the occurrence of said beam, means under control of one of said channels for applying a sweep voltage to said deflecting electrodes, means for controlling the time the electron beam traverses said aperture for coincidence with the receipt of each pulse of at least one of said series, the beam striking the barrier electrode in coincidence with the pulses of others of said series, and output connections from the barrier electrode for said other series of pulses.

9. Means for separating a desired series of recurring pulses from other series of pulses interleaved therewith in the form of a train, comprising means to produce a beam of electrons, means to modulate said beam on and off in accordance with the occurrence of the pulses of said train, an electron collecting electrode, a barrier electrode disposed in front of said electron collecting electrode and having an aperture therein for passage of electrons, means to apply a sawtooth voltage to cause said beam to sweep across said barrier in synchronism with the occurrence of pulses in one of said series, means to control the sweep path of said beam to effect coincidence thereof with said aperture upon occurrence of the pulses of said desired series, the beam striking the barrier electrode upon occurrence of the other series of pulses, output connections from the collector electrode for the desired series of pulses, and output connections from the barrier electrode for the other series of pulses.

10. Means for separating a certain series of recurring pulses from other series of pulses interleaved therewith in the form of a train, comprising means to produce a beam of electrons, means to modulate said beam on and off in accordance with the occurrence of the pulses of said train, an electron collecting electrode, a barrier electrode in front of said electron collecting electrode and having a predetermined number of apertures therein, means to cause said beam to sweep in succession across said apertures for coincidence therewith upon occurrence of the pulses of certain of said series, the beam striking the barrier electrode in coincidence with the pulses of others of said series and output connections from said barrier electrode for the pulses of said other series.

DONALD D. GRIEG.

REFERENCES CITED

The following references are of record in the file of this patent:

UNITED STATES PATENTS

| Number | Name | Date |
| --- | --- | --- |
| 1,757,345 | Strobel | May 6, 1930 |
| 2,146,876 | Zworykin | Feb. 14, 1939 |
| 2,250,528 | Gray | July 29, 1941 |
| 2,263,369 | Skillman | Nov. 18, 1941 |
| 2,265,216 | Wolf | Dec. 9, 1941 |
| 2,311,021 | Blumlein | Feb. 16, 1943 |
| 2,403,210 | Butement | July 2, 1946 |
| 2,452,157 | Sears | Oct. 26, 1948 |
| 2,477,008 | Rosen | July 26, 1949 |

FOREIGN PATENTS

| Number | Country | Date |
| --- | --- | --- |
| 647,468 | Germany | July 5, 1937 |